Sept. 8, 1959 J. H. HANKIN, JR 2,902,741
POTTER'S WHEEL AND MECHANISM
Filed Aug. 20, 1954 2 Sheets-Sheet 2
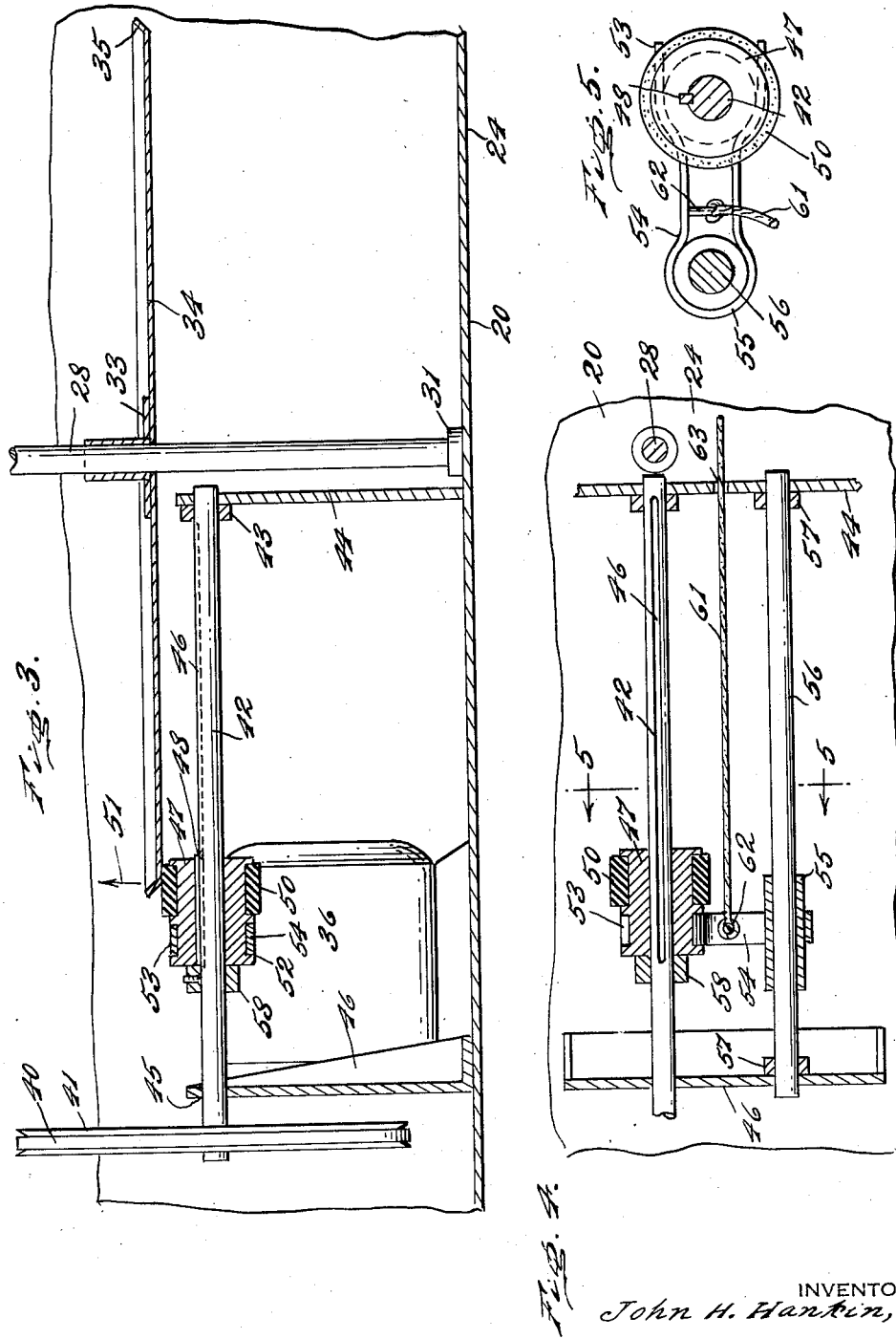
INVENTOR
John H. Hankin, Jr.
BY
ATTORNEYS.

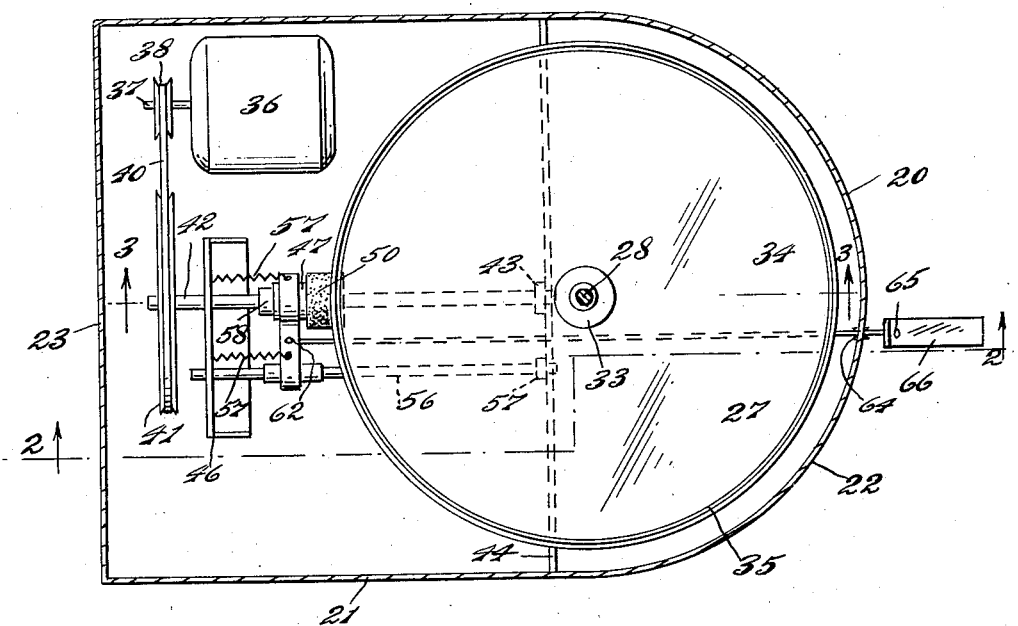

United States Patent Office 2,902,741
Patented Sept. 8, 1959

2,902,741

POTTER'S WHEEL AND MECHANISM

John H. Hankin, Jr., Paulsboro, N.J., assignor to Shirley N. Orcutt, trading as J. J. Cress Company of New Jersey, West Collingswood Heights, N.J.

Application August 20, 1954, Serial No. 451,081

1 Claim. (Cl. 25—24)

The present invention relates to potter's wheels for making pottery and ceramics, and is concerned particularly with drives therefor.

A purpose of the invention is to produce an inexpensive potter's wheel which will permit the production of a potter's wheel which is widely available to schools and to hobbyists.

A further purpose is to reduce the weight and complexity of drives for potter's wheels.

A further purpose is to secure more reliable operation in the reduction of dust and dirt, by driving a potter's wheel by a friction wheel engaging a resilient laterally deflectionable disc, whose resilience or spring bias tends to assure firm driving contact with the friction wheel.

A further purpose is to journal the friction wheel on a carrier, to feed the carrier in longitudinal movement by a shaft, and desirably to manipulate the carrier against retracting springs by a flexible connection to a foot pedal which urges the foot pedal into angularly raised position.

Further purposes appear in the specification and in the claims.

In the drawing I have chosen to illustrate one only of the numerous embodiments in which my invention may appear, selecting the forms shown from the standpoints of satisfactory operation, convenient illustration and clear demonstration of the principles involved.

Figure 1 is a horizontal section of the potter's wheel mechanism of the invention on the line 1—1 of Figure 2.

Figure 2 is a vertical section of Figure 1 on the line 2—2.

Figure 3 is an enlarged fragmentary vertical section on the line 3—3 of Figure 1.

Figure 4 is an enlarged plan section on the line 4—4 of Figure 2.

Figure 5 is a vertical section on the line 5—5 of Figure 4.

Describing in illustration, but not in limitation and referring to the drawings:

Potter's wheels are extensively used in schools to teach pottery and ceramics, and also by hobbyists.

Devices of the kind available in the prior art have generally been relatively expensive, and sometimes not very satisfactory. It is usual in a potter's wheel to have a wide variation of speed, and at the same time, to maintain smooth operation. This is difficult to do in inexpensive merchandise, particularly because of the presence of dust and dirt incident to the formation of ceramics and pottery.

The present invention provides a very inexpensive potter's wheel drive which is reliable and consistent in operation, gives longer life notwithstanding the presence of dust and dirt, and permits very inexpensive manufacture.

In accordance with the invention, the wheel or turn table shaft is driven through a laterally deflective, preferably metallic disc, which engages a radially adjustable friction wheel with such pressure that the disc is constantly deformed or deflected particularly with the force of engagement. This deformation of the disc assures firm contact and positive engagement for change in radial postion.

The friction drive wheel is desirably attached on a driving shaft by spline means, and is journalled in a carrier which is guided with radial motion. The carrier may conveniently be manipulated by a flexible connection holding the upper end of a foot pedal raised in up position to cause proper contact between the driving wheel and driven potter's wheel.

Consider now, the device of the invention in detail, a suitable metallic housing 20 has side walls which form structural side portion 21 and a desirable side portion 22 which is opposed to a straight side portion 23, a bottom wall 24 and a top partition 25, both the top and the side walls excluding considerable dust and dirt from the top compartment away from the driving mechanism.

The top compartment 26 contains a horizontal turn table or potter's wheel 27 which is suitably removably mounted on a vertical shaft 28.

The shaft 28 is desirably journalled at 30 near the top, and at 31 adjacent the bottom.

A pin 32 extending through the shaft 28 desirably engages in a cooperating stop on the potter's wheel or turntable 27 which suitably rests removably on the top bearing engagement.

The shaft 28 has suitably intermediate its bearings, a flanged disc connector 33, secured on the shaft, the flange of the connector being fastened to a lateral deflecting disc 34 of a metal such as steel, stainless aluminum or the like. The disc is desirably formed suitably of the size of 14 to 20 gauge, and has a desirably transversely recessed rim 35 extended in the direction forward from the driving engagement of the disc 34. The rim 35 tends to prevent the disc from warping.

An electric motor 36 or other suitable source of power, drives shaft 37 and a pulley 38, belt 40 drives pulley 41 on a main shaft 42 which is desirably journalled at the inner end at 43 on a bracket 44 extending upward from the bottom, and also at 45 on a bracket 46 extending upward from the bottom.

The main drive shaft 42 preferably extends substantially radially from the bracket 44 as shown, and has spline means 46, which preferably for simplicity's sake is a simple key way to permit longitudinal adjustment of a friction drive wheel 47 surrounding the main drive shaft and engaging the spline means by a key 48. The friction drive wheel 47 is desirably covered by a bearing contact member 50 engaging in a recess in the friction drive wheel, and the table bulges into the path of the disc 34 to such an extent that the disc is resultantly deformed axially at the point of engagement in a manner that is indicated by the arrow 51. It will be evident that this deformation, while it may be of the order of a few thousandths of an inch only, is sufficient to assure very positive contact of the friction wheel and the disc in any operation.

The friction wheel at its outer end, has an outer recess 52 around the outside, and this recess is engaged by the fork ends 53 of a spring carrier 54 which surrounds and is secured to a guiding tube 55 which rides and is guided on a suitable stationary guide shaft 56 parallel to the main driving shaft 42, and suitably secured by collars 57 in the respective brackets 44 and 46.

The carrier 54 is guided toward radially outer limiting position by helical tension springs 57 which are anchored on the bracket 46 and in limiting position outward, the friction wheel is stopped by collar 58 secured to the main drive shaft.

To move the friction wheel radially inwardly to change the driving speed, flexible connection is secured to a cross piece 62 on the carrier. The flexible connection passes through an opening 63 in bracket 44, is guided over pulley 64 and engages the top at 65 of a foot pedal 66, the lower end 67 of which merely rests on the floor.

In radial outer position, the foot pedal 66 is disposed upwardly at an angle suitably of the order of 30 to 60 degrees, and the operator can manipulate the carrier on the friction wheel by depressing the foot pedal without any need of a pivot.

In operation of the device, with the mechanism assembled as shown, the motor can be started and the wheel will turn at a speed incident to the radial outer position of friction driving wheel. When it is desired to change the wheel speed, the operator depresses the foot pedal which pulls the flexible connection and moves the carrier and the friction wheel, radially inwardly, further deforming the disc forward from the friction wheel and thus assuring uniform engagement so that the potter's wheel will operate reliably at any speed permitted by the range of friction wheel movement.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claim.

Having thus described my invention, what I claim as new and desire to secure by Letters Patent is:

In a potter's wheel, a rotatable turntable on a vertical axis, the vertical shaft mounting the turntable, a resilient laterally deflectable driving disc mounted on the vertical shaft below the turntable, the disc having an upwardly directed rim, a drive shaft extending horizontally beneath the disc and generally radially of the disc, spline means on the drive shaft, a guide shaft parallel to the drive shaft, a guide on the guide shaft moving longitudinally thereof, a carrier supported on the guide and extending to the drive shaft, a friction driving wheel journalled on the guide, surrounding and cooperating with the spline on the drive shaft, obtruding into the path of the driving disc and deflecting the driving disc in the axial direction at the point of engagement with the frictional drving wheel, and means for moving the carrier along the guide shaft.

References Cited in the file of this patent

UNITED STATES PATENTS

| 566,036 | Taylor | Aug. 18, 1896 |
| 2,047,733 | Harrison | July 14, 1936 |

FOREIGN PATENTS

| 322,130 | Germany | June 21, 1920 |
| 86,169 | Austria | Nov. 10, 1921 |
| 605,794 | France | Feb. 22, 1926 |